US000001441H

United States Statutory Invention Registration [19]

[11] Reg. Number: H1441

Kosinski

[43] Published: Jun. 6, 1995

[54] HPM HARDENED MINE

[75] Inventor: John A. Kosinski, Wall Township, Monmouth County, N.J.

[73] Assignee: The United States of America as represented by the Secretary of the Army, Washington, D.C.

[21] Appl. No.: 334,838

[22] Filed: Nov. 4, 1994

[51] Int. Cl.[6] ..... F42C 13/08; F42C 15/00

[52] U.S. Cl. ..... 102/427

*Primary Examiner*—Charles T. Jordan
*Assistant Examiner*—Christopher Keith Montgomery
*Attorney, Agent, or Firm*—Michael Zelenka; William H. Anderson

[57] ABSTRACT

The invention is a high power microwave hardened mine wherein a detonation charge and its appropriate detonation circuitry are disposed within a housing that is impervious to high power microwave energy. A power source and a sensor that provides the detonation signal are connected to the detonation circuitry via two sets of input and output piezoelectric transducers which convert an electrical signal to an acoustic one, the input, and then convert the acoustic signal back to an electrical signal, the output. By providing for d.c. to r.f. and r.f. to d.c. converters, the power source can be placed externally to the metal package and therefore, the battery can be easily and safely replaced.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

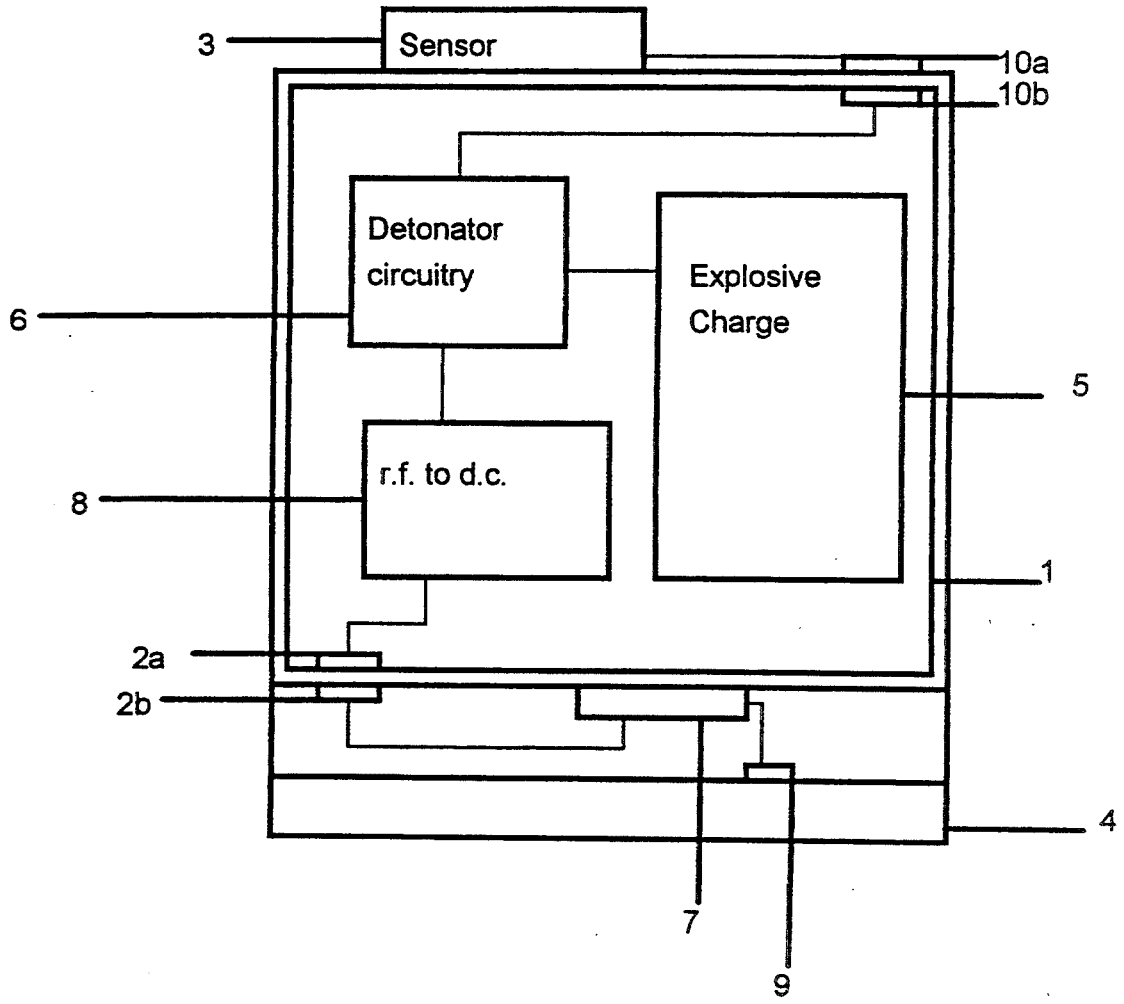
Figure

HPM HARDENED MINE

GOVERNMENT INTEREST

The invention described herein may be made, used, sold and/or licensed by, or on behalf of, the United States of America without the payment to me of any royalties thereon.

FIELD OF THE INVENTION

This invention relates to the field of anti-personnel devices and, in particular, to high power microwave protected mines.

BACKGROUND OF THE INVENTION

There are a multitude of anti-personnel weapons currently in existence today. One problem with these anti-personnel weapons, including buried mines, is that they are very susceptible to detonation by high power microwave (HPM) energy. Due to this susceptibility, anti-personnel devices may be detonated intentionally or by accident by high power microwave energy sources. Accordingly, the effectiveness of certain mines has been diminished because an enemy can detonate mines in a known mine field or because mines can be detonated inadvertently causing "friendly fire" accidents.

Accordingly, there is a need to make mines hardened to high power microwave energy. The present invention addresses this need.

SUMMARY OF THE INVENTION

One object of the present invention is provide for a means to harden anti-personnel devices against high power microwave energy.

Another object of the present invention is to provide for such a anti-personnel device, but which may be made in a cost effective manner.

Still another object of the present invention is to provide for an anti-personnel device which may be safely installed and activated.

These and other objects of the invention are accomplished by providing a detonation charge and its appropriate detonation circuitry within a housing that is impervious to high power microwave energy. The power source and the detonation signal are then connected to the detonation circuitry via two sets of input and output piezoelectric transducers which convert an electrical signal to an acoustic one, on the input end, and then convert the acoustic signal back to an electrical signal, on the output end.

BRIEF DESCRIPTION OF THE DRAWING

These and other features of the invention will become more apparent in light of the following Detailed Description of the Invention and associated FIGURE wherein:

The FIGURE is a cross-section view of the preferred embodiment of the present invention.

DETAILED DESCRIPTION OF THE INVENTION

Referring now to the FIGURE there is shown a high-power-microwave (HPM) protected mine which includes a continuous metal package 1 through which HPM signals are attenuated to safe levels. Sensor signals and power supply are brought through the metal package as acoustic waves using piezoelectric transducers 2*a* and 2*b* and 10*a* and 10*b*, respectively, one of each pair being mounted externally and the other being mounted internally to the metal package 1. The sensor 3 can sense pressure, magnetic anomaly, acoustic signature, etc in order to send a signal to the detonation circuitry 6. A battery 4 is also mounted externally in order to be replaceable, but may be internalized if replacement is not desired. The typical explosive charge 5 and detonator circuity 6 are mounted inside the metal package 1. For an externally mounted battery 4, an externally mounted d.c. to r.f. converter 7 and internally mounted r.f. to d.c. converter 8 are used. The battery connector 9 does not required special shielding.

The operation of the mine is simple. The metal package 1 without penetrations in the metal package 1 isolates the sensitive detonator circuitry 6 and explosive charge 5 from HPM. Power is supplied from the battery 4 as d.c. and is converted to r.f. by converter 7. The converted r.f. signal is then converted by outer transducer 2*b* to an acoustic wave, which propagates through the package wall 1 and which is reconverted to r.f. by inner transducer 2*a*. The r.f. signal is then reconverted from r.f. to d.c. by converter 8 and distributed as needed.

Sensor 3 is a passive r.f. based device whose frequency response changes in a prescribed fashion in response to pressure, magnetic anomaly, etc. This allows the detonator circuity to interrogate the sensor using an r.f. signal which is transduced through the package wall 1 by a second pair of transducers 10*a* and 10*b*.

This description is of the preferred embodiment. Numerous alternative embodiments can be conceived wherein the HPM sensitive electronics and/or charge are in the shielded compartment, and numerous sensors, actuators, power supply, etc. are external to the shielded compartment and are connected via piezoelectric transducer pairs.

What is claimed is:

1. A mine which is hardened against high power microwave energy comprising:

a metal package that is of such dimensions so as to attenuate high power microwave energy;

a pair of piezoelectric transducers mounted on the metal package such that one transducer of the pair is mounted on an inside of the metal package and the other transducer of the pair is mounted on an outside of the metal package;

a sensor means disposed externally to the metal package, the sensor means being electrically connected to the transducer mounted on the outside of the metal package;

detonation circuitry disposed in the metal package, the detonation circuitry being electrically connected to the transducer mounted on the inside of the metal package;

an explosive charge disposed in the metal package and connected to the detonation circuitry; and a battery disposed in the metal package and connected to the detonation circuitry.

2. A mine which is hardened against high power microwave energy comprising:

a metal package that is of such dimensions so as to attenuate high power microwave energy;

first and second pairs of piezoelectric transducers each pair mounted on the metal package such that one transducer of each pair is mounted on an inside of the metal package and the other transducer of each pair is mounted on an outside of the metal package;

a sensor means disposed externally to the metal package, the sensor means being electrically connected to the transducer of the first pair which is mounted on the outside of the metal package;

detonation circuitry disposed in the metal package, the detonation circuitry being electrically connected to the transducer of the first pair which is mounted on the inside of the metal package;

an explosive charge disposed in the metal package and connected to the detonation circuitry;

a battery disposed outside the metal package;

a d.c. to r.f. converter mounted on the outside of the metal package and connected to the battery and to the transducer of the second pair which is mounted on the outside of the metal package; and an r.f. to d.c. converter disposed in the metal package and connected to the transducer of the second pair which is mounted on the inside of the metal package and to the detonation circuitry.

* * * * *